United States Patent

Swager

[11] 4,077,094
[45] Mar. 7, 1978

[54] CLAMPING DEVICE FOR A ROPE, CABLE, ANNULAR BAR, OR THE LIKE

[76] Inventor: William E. Swager, P.O. Box 656, Fremont, Ind. 46737

[21] Appl. No.: 724,457

[22] Filed: Sep. 17, 1976

[51] Int. Cl.$^2$ .................... F16G 11/10; A62B 1/14
[52] U.S. Cl. ........................... 24/134 R; 182/5
[58] Field of Search .............................. 24/134 R, 254

[56] References Cited

U.S. PATENT DOCUMENTS

| | | | |
|---|---|---|---|
| 152,635 | 6/1874 | Goff | 24/134 R |
| 1,298,614 | 3/1919 | Whitkanack | 24/134 R |
| 1,340,851 | 5/1920 | Lind | 24/134 R |
| 1,372,853 | 3/1921 | Wellen | 24/134 R |
| 2,226,937 | 12/1940 | Masset | 24/134 KC |
| 2,228,831 | 1/1941 | Laquerre | 24/134 KC |
| 2,605,130 | 7/1952 | Meighan | 24/134 R |
| 3,017,678 | 1/1962 | Christensen | 24/134 R |
| 3,108,345 | 10/1963 | Kito | 24/134 R |
| 3,262,171 | 7/1966 | Scholz | 24/134 R |
| 3,317,971 | 5/1967 | Meyer | 24/134 R |

FOREIGN PATENT DOCUMENTS

| | | | |
|---|---|---|---|
| 1,429,441 | 1/1966 | France | 24/134 R |

Primary Examiner—Bernard A. Gelak

[57] ABSTRACT

A clamping device is formed of nestable body members pivotally hinged together, forming an inner space between them, housing and slidably supporting an elongated body such as a cable, bar, tube or the like in pivotally closed position, the large member having side walls one of which is elongated and the other shortened and forming an open space for receiving said elongated body and for mounting of said clamping device about any point thereon, one body member pivotally supporting a clamping means comprising an inner portion cam-shaped and pivotally bearing against and gripping said elongated body, an outwardly extending trigger arm for actuation by a chain worn about or attached as a safety device to the waist of a climber, ascending or descending a ladder or the like. Ascent of the climber allows him to draw the clamping device slidingly upon the elongated body as he ascends or descends the ladder, pivotally pulling the cam element out of gripping engagement of the elongated body. A reverse pull causes the cam to grip and clamp the device to the elongated body.

8 Claims, 10 Drawing Figures

CLAMPING DEVICE FOR A ROPE, CABLE, ANNULAR BAR, OR THE LIKE

This invention relates to a clamping device comprising pivotally joined body nestable members supporting a clamping element, and shaped in combination to be slidably mounted about an elongated body such as a rope, cable, pipe, bar or the like for clampingly engaging the same, and more particularly, the clamping device hereof has the body members pivotally joined and secured in clamping position by a locking means. Said body members may be openable upon their pivot to receive said elongated body at any selected position and in pivotally closed and locked position is alternately slidable upon and has means for clampingly engaging said elongated body in normal use position.

The smaller body member has pivotally mounted clamping means which preferably comprises a trigger arm having an inner end cam-shaped with respect to the pivot and bears progressively to grippingly engage the elongated body as a clamp thereon. The trigger arm extends upward of the pivot and is adapted to be engaged by a chain or rope secured to the waist of a climber ascending or descending a ladder near or to which the elongated body is mounted and using the clamping device as a safety means.

Various clamping means for an elongated body such as a rope or cable are known in the art and may have a pivotally supported cam-like or clamping means bearing against the rope or cable actuated by an outwardly extending trigger arm. One difficulty with that type of construction is that the cable must be threaded into the clamp from one exposed end of the elongated body and must be drawn through for as much of its length as is needed to position the clamping means thereon. This could be several feet or hundreds of feet depending upon the length of the cable. Also for large diameter cables, bars, pipe or the like about which a clamping means is desirably secured, it is possible to bolt or unbolt portions of a clamping means for securing it positioned thereon, but these clamping elements are often heavy and may be needed to be applied to the rope or cable at great elevations and with great difficulty and danger in the mechanical handling to secure parts of the clamp together and to the rope or cable.

According to an aspect of the present invention the cable gripping cam is pivoted in a small housing supported by a pivot at one end of a larger housing, so that the two housing portions may be pivotally moved with respect to each other, both housing portions having its bodies nestable the smaller within the larger, and having wall portions spaced in pivotal movement from each other to expose a wall spacing large enough to allow the clamp to be inserted about the elongated body such as the rope, cable, pipe or the like, and upon the reversed pivotal movement of both housings the elongated body becomes slidably disposed and biased between both housing bodies.

In another aspect, both housings may be closed together and locked in closed positions preferably by a slidable locking pin.

The invention is further described in relation to the drawings, wherein

Figure 1:
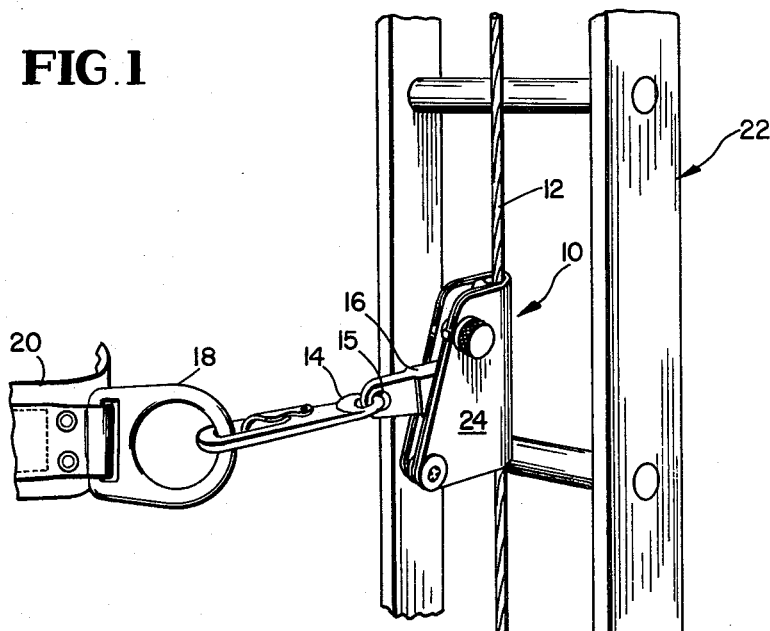
FIG. 1 shows the clamping means mounted near the rungs of a ladder with the trigger arm fastened to a belt of a climber.

As shown in FIGS. 1, 2, 3 and 7, the clamping device 10 in assembled position will be mounted to slide vertically upon a rope as engaged by a chain 14 fastened through a bore 15 in the end of the outwardly extending trigger arm 16. The chain 14 may have its other end secured to a link 18 of a belt 20 usually worn fastened about the waist of a climber ascending a ladder 22, and thus lifting the clamping means 10 slidably on the rope 12 as he ascends or descends the ladder.

Figure 2:
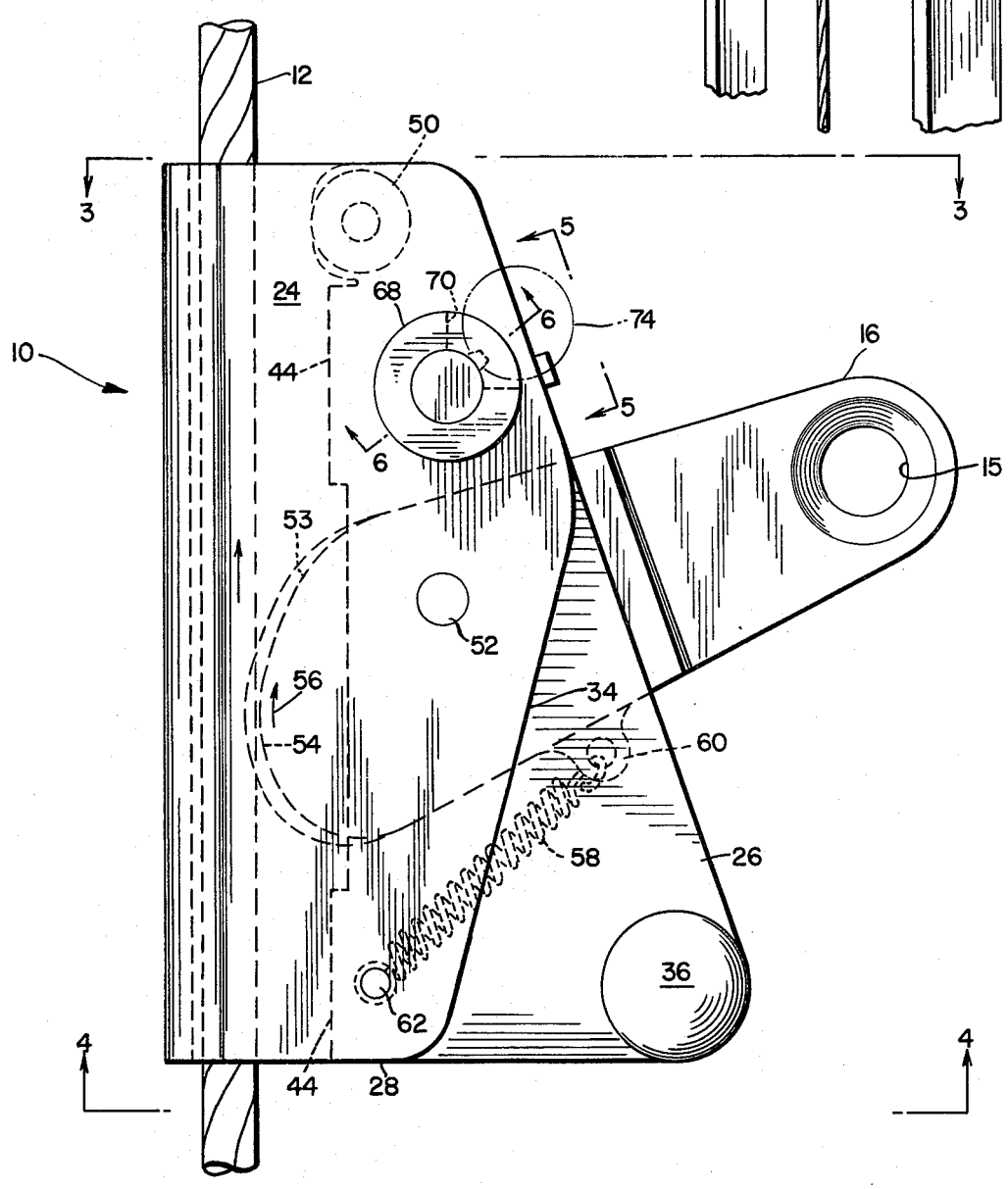
FIG. 2 is a side elevation of the assembled clamping device hereof.
Figure 3:
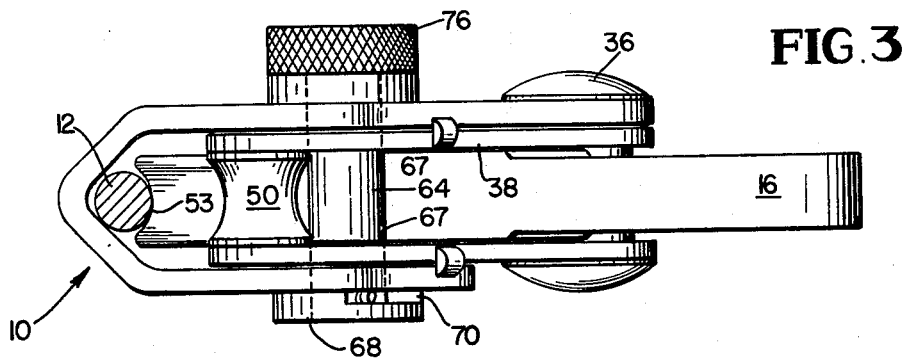
FIG. 3 is a plan view looking downward upon the clamping device in the direction of arrows 3-3 in FIG. 2.
Figure 4:
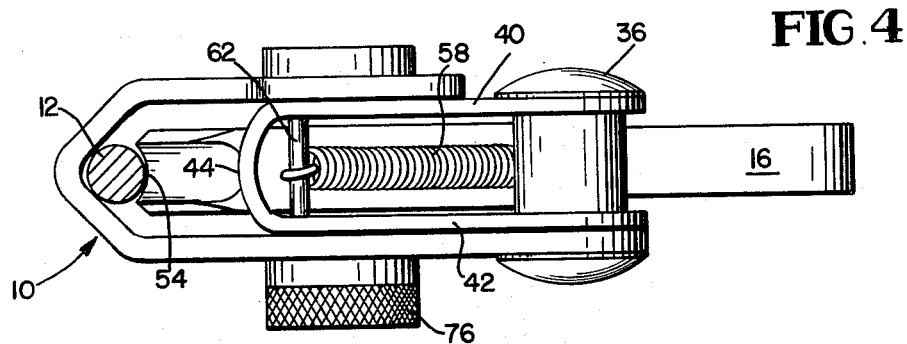
FIG. 4 is a bottom view looking upward upon the assembly of FIG. 2 in the direction of the arrows 4-4 thereof.
Figure 3A:
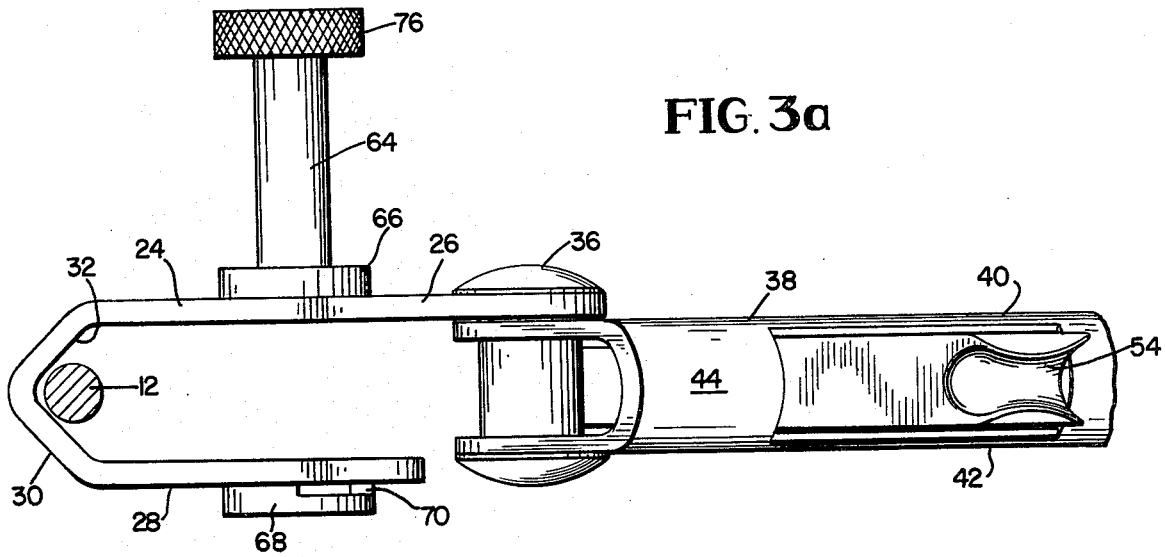
FIG. 3a is a similar plan view with the housing unlocked in pivotally separated position.
Figure 7:
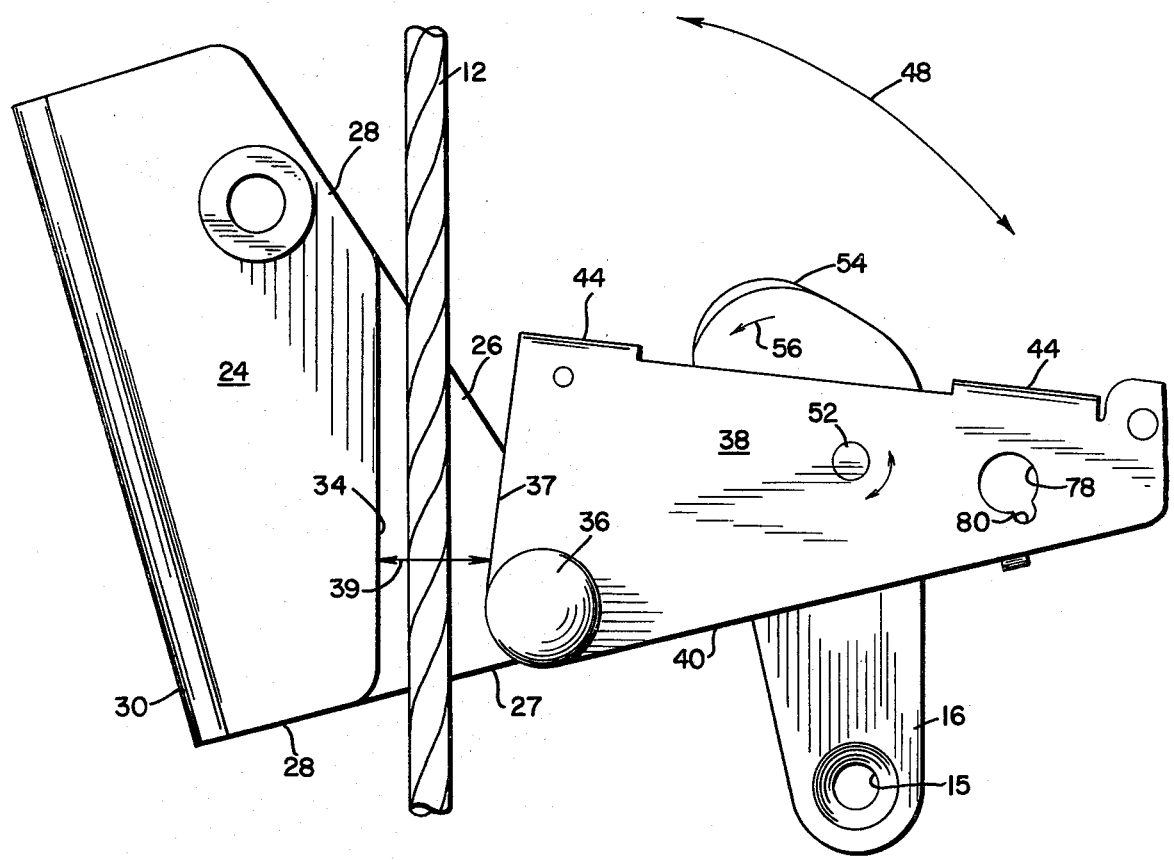
FIG. 7 is a side elevation of the pivotally separated housing showing the manner of engagement of a clamping device upon a rope in pivotally open position.

The clamping device 10 is formed of an outer large housing body 24 having an elongated side wall 26 at one side, and a shortened side wall disposed parallel thereto as an opposite side wall, there being a bent channel portion 30 joining both side wall members 26 and 28 together. The bent portion 30 may be rounded into a V or U-shape or even bent at any selected vertical angular point. As shown in FIG. 3a it is a V-shaped channel sized to slidingly receive against its inner wall 32 an elongated annular body support member such as a rope 12, or alternately as desired any elongated member such as a rod, pipe, cable or the like. The housing sides 26 and 28 of the body member 24 are spaced to accommodate the selected size of the rope, cable or the like about which it will slide, or to which it will fasten. The wall 28 has a cutaway portion 34, as shown in FIGS. 2 and 7. The opposite side wall 26 is extended into a shoulder 27 to which is secured and supported a pivot pin 36.

A smaller inner housing body 38 has similarly bent parallel side walls 40 and 42 having a rounded inner wall 44, connecting both sides as a channel, the space between walls 40 and 42 being narrow so that the smaller housing body 38 fits slidingly between the larger housing walls 26 and 28. The pivot pin 36 is mounted near an end of the extended shoulder 27 of side wall 26 passes through both walls 40 and 42 of the smaller housing 38 and pivotally supports the smaller housing 38 to swing open and close in the direction of arrows 48. The entire sub housing 38 thus will pivot upon the pin 36 between closed positions of FIGS. 1 and 2 and open position of FIG. 7.

The pivot 36 and the lower end 37 of housing 38 in open position is spaced from the cutaway wall 34 of the larger housing 24 to provide a space 39 between arrows 36 large enough to allow lateral insertion of the elongated body such as the rope 12 and thence slidably into the inner housing end 30 of the housing 24, whereby the total clamping means may be inserted upon and fastened about an elongated body or rope 12 at any point thereof with the smaller housing opened in the position of FIG. 7.

A rounded portion or roller 50 is pivotally mounted near the top of the housing and in closed position of FIG. 2, may engage the elongated body or rope 12 for easy sliding movement thereagainst. Rounded shoulders 44 will allow the elongated body to slide easily in the aperture formed between the closed housings.

The inner housing 38 has a pivot pin 52 extending from wall 40 both to inner housing walls 30 and 44 of the wall 42 supporting the pivot arm 16 through its center of balance. The inner end 54 of the pivot arm is cam-shaped as rotated on pin 52, and will increase in displacement for bending against the elongated body 52 in the direction of the arrow 56. In the closed position of both housings with the elongated body 12 disposed in FIG. 2, the cam-shaped end 54 extends inward and may have a curved surface 53 fitting against the elongated body 12. In downward movement of arm 16 the cam 54 tends progressively to engage the body 12 more firmly, thus to lock assembly thereto as the relative movement of the clamping device thereon is downward in frictional contact therewith. That is, the cam face is biased upward in the direction of the arrow 56 in bending clamping engagement against the elongated body 12. A spring 58 is fastened to a bracket 60 extending from one end of the arm 16 and to a pin 62 supported near the inner end of housing 38. The spring 58 is in tension and consequently biases the trigger arm 16 and the cam in the direction of the arrow 56, and thus into firm frictional clamping engagement with the elongated body 12.

The housings 24 and 38 are pivotally held together by the pin 36 and in the locking position upon the rope of FIG. 2 may be secured firmly against pivotal movement by a locking pin 64 mounted to slide through a pair of rings 66 fastened to the walls 28 and 26 and about corresponding holes 67 bored therein, respectively, of the housing 24.

Figure 5:
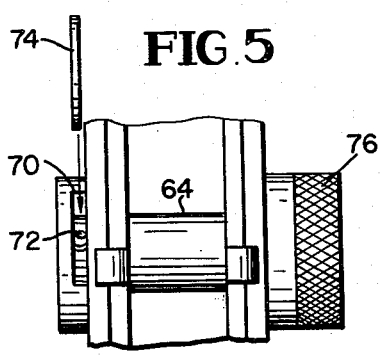
FIG. 5 is a detail showing the operation of a locking pin for disengaging the clamping housings.
Figure 5A:
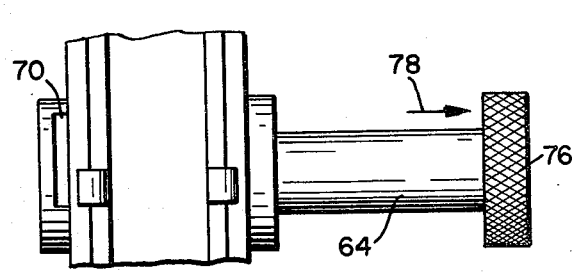
FIG. 5a is the same detail of FIG. 5 with the pin partially withdrawn in the direction of the arrow for passing to unlocked position.
Figure 6:
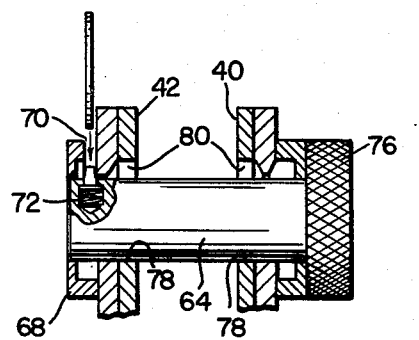
FIG. 6 is a sectional detail through the pivot pin taken on the line 6—6 of FIG. 2.
Figure 6A:
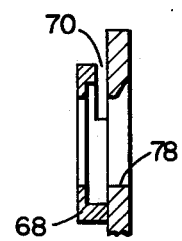
FIG. 6a is a similar detailed view with the pivot pin partially withdrawn from locking engagement from the housing.
Figure 6A:
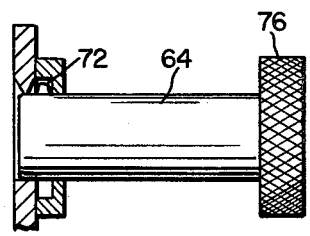

The pin 64 is preferably of the locking type as described in my co-pending application filed July 12th, 1976 Ser. No. 704,628 and my co-pending application filed December 6th, 1976 Ser. No. 724,264; whose disclosure is here incorporated for reference, and as to common subject matter, the present application is a continuation-in-part thereof. A spring-biased detent is slidably mounted in its locking end, which may be depressed for unlocking pin 64 by inserting a key or coin 74 into a slot 70 cut into the ring 68 for depressing the detent, and thus allowing sliding movement of the locking pin 64 to the open position, as shown in FIG. 3a, the detent 72 is spring-biased laterally for locking the pin 64, the detent 72 having a tapered tip which extends into the groove 70. A key or coin 74, as shown in FIG. 5, is inserted into the slot 70 depressing the tip of the detent 72, thus allowing the pin to be manually gripped by the knurled head 76, and withdrawn by axial movement. As shown in FIGS. 3 and 6, the sub housing 38 is bored at 67 to slidingly receive the ends of the pin 64 in each side and has a groove 78 cut in one portion to allow the detent 72 to be angularly depressed and passed through the walls 40 and 42 of the sub housing in movement of the pin 64 axially in locking and unlocking engagement of the pin 64.

As thus described, a main and sub housing are pivotally secured to nest together by a pin 36 supported from a portion of a wall of the outer housing and in the closed position of FIG. 2 an elongated body such as a rope, pipe or the like is held between inner housing ends slidingly in vertical movement thereabout. A locking pin 64 will lock both housings firmly together. That pin may be easily unlocked by a key or coin depressing of the detent to allow axial sliding withdrawal of the locking pin from locked position, securing both housings together. When the assembly is thus unlocked the sub housing may be swung into open body position upon a pivot position. As shown in FIG. 7, the elongated body may be inserted or withdrawn from the locking device in open position and then in pivotal movement after inserting the elongated member the housings are passed to the locked position of FIG. 2. The cam 54 biased by the spring 58 will bear against and progressively grip the rope or cable in relatively downward movement of the locking device on the rope.

In use, the outer end of the trigger arm 16, as shown in FIG. 1, has a link 14 of a chain passing through a hole 15 therein, an opposite end 18 of a belt 20 will fasten about the waist of a climber. The rope or cable 12 is fastened near or to the ladder as safety support element. The climber ascends the ladder 22 and draws the clamping device along with him sliding on the rope 12 as he ascends. The tension in the spring 58 may be balanced against the weight of the clamping device transferred by the arm 16 and offsetting the tensioning force of spring 58 to disengage the clamp from substantial frictional pressure against the rope, as the climber ascends, whereby the device will slide easily thereon. The weight of the clamping device so held will allow easy ascending or descending movement as well, the weight of the device still holding the cam surface disengaged to allow sliding movement against the rope. However, any false step or a falling movement of the climber will release the spring and trigger arm 16 causing the cam to bind firmly frictionally against the rope, and imparting firm locking thereupon to prevent any injury to the climber by falling.

It is also possible to use the clamping device hereof for fastening of a hook of a cable depending from a hoist, derrick or the like and by inserting the clamping device upon a companion cable, with the hoist pulling upward, both cables will thereby be locked together, allowing easy coupling of one cable to a parallel rope, pipe or the like. Other uses of the locking device herein described will be apparent to one skilled in the art.

As thus described, a locking device is provided for a cable, rope or the like in which the locking device is slidingly secured thereto operative as a safety device for use by a climber. The device comprises a pair of housing elements pivotally secured together and which may be locked together firmly and securely, avoiding accidental displacement of the locking device from the rope. An outstanding feature is that a main and sub housing pivotally secured together may be opened to allow mounting of the device easily about the rope at any vertical position thereof. Thus a climber at various platform areas may easily disengage his safety lock from the rope freely at various levels, and when he ascends or descends a staircase, ladder or the like he merely pivotally opens his clamping device, secures the same about a nearby cable and locks the assembled housings firmly together and he may then ascend or descend safely.

Other modifications will appear to those skilled in the art, and it is accordingly intended that the description given herein be regarded as exemplary and not limiting except as defined in the claims appended hereto.

What is claimed is:

1. A safety clamp for mounting about and clampingly engaging an elongated body of the character of a rope, cable, bar, pipe or the like comprising a pair of housing members, pivot means securing said members together nestably for pivotal movement from closed clamping position nested together, and allowing pivotal movement to open position and providing open lateral space for inserting and mounting about said elongated body, said housing members comprising a larger member nestably encasing a smaller member in closed pivot position forming an inner space therebetween sized to enclose, slidably receive and guide said elongated body in relative movement therein, means for releasibly fastening said housings together in operative clamping position upon said elongated body, and manually actuated clamping means supported in said smaller housing member in spring biased position for engaging and gripping said elongated body immovably in clamped position thereon.

2. The safety clamp as defined in claim 1 wherein each of said housing members having parallel side walls are secured together by end sections, spacing said side walls to slide, the smaller within the larger, in pivotal movement, said end sections being supported by said pivot means to form said space between said housing in pivotally closed and nested positions, with the inner ends sized to enclose said elongated body with said elongated body being positioned for engagement by said clamping means.

3. The clamp as defined in claim 2 wherein a side wall of the larger housing member has a portion thereof cut away and the opposite side wall parallel thereto has an elongated shoulder, said pivot means passing through said elongated shoulder pivotally supporting the smaller housing member for pivotal movement between open and closed positions within said larger housing member, said elongated side wall and cutaway portion of the side wall opposite thereto being relatively spaced in pivotally open position of the said housing members to provide a space sized to receive said elongated body whereby the clamp in open housing position may be secured about said elongated body at any selected point of its length.

4. The safety clamp as defined in claim 1 wherein said locking means is disposed to slide between and engage both of said housing members and secure them together in pivotally closed position.

5. The clamp as defined in claim 4 wherein the locking means is a slidable bolt supported for axial sliding movement in holes bored in alignment between both housing members in closed position and means securing said bolt axially in locked position between said members, and means manually applicable to said locking means for unlocking said bolt to allow axial sliding movement at least sufficient to free said housings for relative pivotal movement in unlocked position.

6. The claim as defined in claim 4 in which the means securing said bolt is a spring biased detent mounted for radial sliding movement in an end of said bolt, said detent having a tapered tip extending radially outward of said bolt, a groove cut at least in the outermost housing wall to receive said detent and lock said bolt against axial movement, and a key slot cut from an outer surface of said housing wall to form a passageway to the tip of said detent, whereby insertion of a key in said slot to depress said detent will unlock said bolt for axial sliding movement through said housings releasing them for pivotal movement.

7. The safety clamp as defined in claim 1 wherein the smaller housing supports a clamping means for radial movement between its side walls, said clamping means having an inner end extending through a channel end section and being cam-shaped and positioned on its pivot to bear in radial movement against said elongated body and continuing into an arm extending at its opposite end outward of said clamp for fastening to the body of a climber in ascending or descending movement parallel to said elongated body, whereby to actuate said clamping means by a downward cam gripping movement upon said elongated body.

8. A safety clamp for mounting about an elongated body of the character of a rope, cable, bar, pipe or the like comprising a larger and a smaller housing member each having side walls sized to nestably slide, the smaller within the larger, pivot means securing said members together for pivotal movement from closed clamping position to open position for mounting about said elongated body, said larger housing member having a cutaway portion in one side wall and an elongated side wall opposite thereto providing a supporting shoulder for said pivot for the smaller housing member mounted thereon, said pivot and smaller housing member being spaced in open pivot position from said cutaway side wall for inserting said elongated body for mounting of said safety clamp at any selected point of its length, locking means to engage both housing members and secure them together in pivotally closed position, and manually actuated clamping means pivotally supported by the smaller housing member for rotation between side walls and having a cam shaped inner end continuing into a trigger arm extending outwardly of said clamp, said housing members in closed pivot position forming a space sized to enclose, slidably receive and guide said elongated body in relative movement, said cam surface in pivotal support having biasing means, to bear in gripping engagement against the surface of said elongated body, increased by downward pull upon the said trigger arm and released from said gripping position by upward pull on said trigger arm in safety use of said clamp by engaging said outer end by a climber ascending or descending vertically parallel to said elongated body.

* * * * *